Nov. 23, 1926. 1,607,998
C. S. PRESTON
COMBINATION AIR AND DUST CAP
Filed July 16, 1925

Clarence S. Preston.
INVENTOR.

BY  J. W. Shuley.
ATTORNEY.

Patented Nov. 23, 1926.

1,607,998

UNITED STATES PATENT OFFICE.

CLARENCE S. PRESTON, OF SAN DIEGO, CALIFORNIA.

COMBINATION AIR AND DUST CAP.

Application filed July 16, 1925. Serial No. 43,931.

The present invention relates to pneumatic tire valves and pertains more particularly to air caps, dust caps and like closure for such valves.

Practically all tire valves in use to-day embody an elongated externally threaded stem or body having an upper reduced end, also externally threaded.

A small air-retaining cap is usually screw-threaded onto the upper reduced end, and a long internally threaded dust cap is fitted over the whole assembly by interengagement of its threads with the external threads of the valve body.

The hard metal cone set forth in my co-pending application, Serial No. 758,380 is designed to reduce or overcome leakage.

It is among the objects of the present invention to apply said conical member to a combination dust cap and air-holding cap which is adjustable to various protruding extents of valve bodies.

Another object of the invention is to provide a simple and effective combination of the above mentioned type which may be removed and applied with fewer operations than any known combination tire valve closure of said type.

The small size and reduced number of threads provided by the upper reduced end of present valve bodies, renders it impractical to apply too much wrench torsion in putting on an air-tight cap, and it is among the objects of this invention to provide a closure in which considerable force, if necessary may be applied in setting it against leakage.

Another object of the invention is to provide for adapting the present invention to the original large size valve bodies devoid of threaded collars, and also to adapt the invention to the newer reduced sizes of valve bodies having the short threaded collar.

Another important object of the invention is to provide an improvement in the conical member set forth in the said co-pending application.

Still other objects and advantages of the invention will appear hereinafter.

I have illustrated my invention by the accompanying drawings in which.

Figures 1, 2:
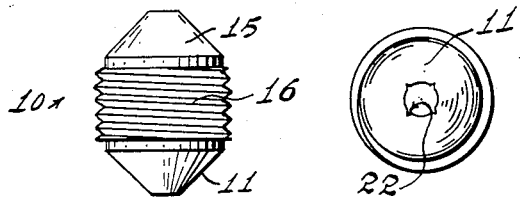
Fig. 1 is an enlarged detail vertical section of an improved conical member for use in one embodiment of the present invention.
Fig. 2 is a view in bottom elevation thereof.
Figure 3:
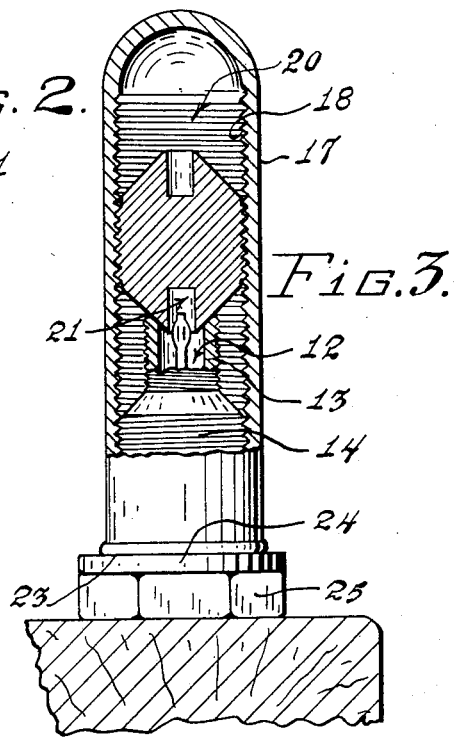
Fig. 3 is a view mainly in vertical section, some parts being shown in elevation, of a complete embodiment of my invention applied to the said large size of valve body.

Referring particularly to Figs. 1, 2 and 3, the member 10 shown in Fig. 1 embodies a conical end or surface 11 adapted to enter the bore 12 of the upper reduced end 13 of a valve body 14. Said member, or at least the conical end, is of hard metal so that upon being turned on the end of such valve body, will be capable of smoothing the metal and shaping a seat for itself. The objects and advantages of the hard metal cone are set forth in the co-pending application above mentioned.

Said member is also provided with an upper conical end 15. It is not essential that the upper end be of any particular shape, but it will be apparent hereinafter that it is just as economical and by far more advantageous to have it conical than any other shape. Therefore the upper conical end may be made an exact duplicate of the lower end so that its ends are interchangeable. Intermediate of the ends, the member 10 is externally threaded as at 16.

In Fig. 3, a large size standard valve body is shown, and said body is provided with a long dust cap 17, capable of enclosing any common length of valve body. Said cap is provided throughout with internal threads 18 and is, in practically all respects, a counterpart of the dust caps employed on practically all inner tubes. Said cap obviously will fit on the smaller sizes of valve bodies, by engagement with the threaded collar 19, shown in Fig. 4.

The conically ended member shown in Fig. 3, the same as that shown in Fig. 1 is adapted to be screw-threaded into the hollow interior or bore 20 of the dust cap 17. At the base of each conical end there is provided a small cavity 21. Preferably said cavity is notched, as at 22, so that a square instrument or wrench (not shown) may be employed to rotate the member 10 in the dust cap for the purpose of adjustment, removal or replacement.

In applying the complete cap, shown in Fig. 3, to a valve body of given length, the member 10 is screwed into the cap the correct distance. It may be necessary to make more than one attempt before it can be properly adjusted. When properly situated, the conical end will seat firmly on the upper end of the valve body, just before the lower end 23 of the dust cap reaches a gasket 24, usually provided above nut 25. The gasket should be soft and of ample thickness, so that it will seal the lower end of the cap without interfering with full seating of the cone on the upper end of the valve body.

By jamming of the threads on member 10 and the cap 17 respectively, the conical member will not change position in the cap and will even be rotated very slightly upon its seat when a wrench is used to tighten the device.

Owing to the great number of threads on the valve body, which may be engaged by the threads in the dust cap, there is no danger of stripping such threads, and the complete combination air and dust cap unit may be applied with considerable force so that the conical end will shape a suitable seat for itself in the softer metal of the valve body.

Figure 6:
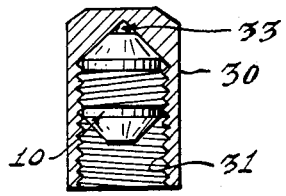
Fig. 6 is a vertical section of an air cap using the member shown in Fig. 1.

In the form of the invention shown in Fig. 6, an air cap 30 is provided with an internally threaded bore 31. Said cap is adapted to engage only the upper threaded reduced extent of a valve body. The cap is preferably made of solid hexagonal stock and the bore is made by drilling. Naturally, the drill which makes the bore, leaves a conical cavity 33 in which the upper reversed conical end of the member 10, may repose without damage. Said cap, with the member 10 inserted, functions in substantially the same manner as the cap just described.

Figure 4:
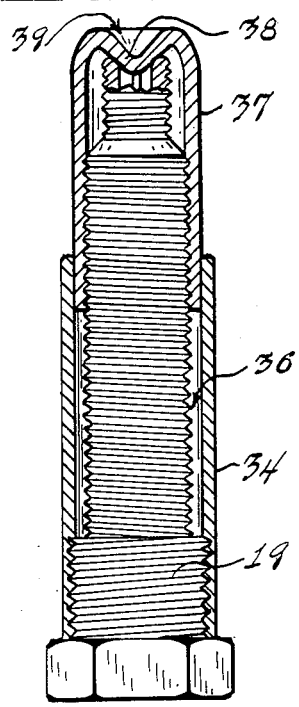
Fig. 4 is a similar view of an embodiment of my invention applied to the smaller size of valve body, which valve body is fitted with the above mentioned threaded short collar.
Figure 5:
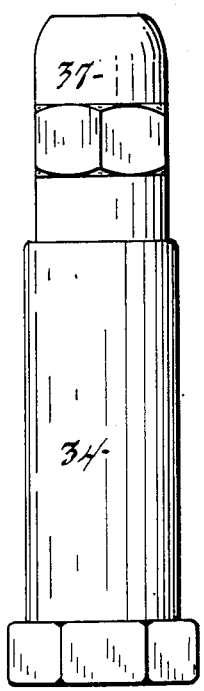
Fig. 5 is a view in elevation of the assembly shown in Fig. 4.

In the form of the invention shown in Figs. 4 and 5, the smaller size of valve body is shown fitted with said externally threaded collar 19.

I provide an internally threaded sleeve 34, different lengths of which may be kept in stock by dealers. Said sleeve screw-threads with the collar and stands spaced away from the valve body, leaving an intermediate annular space 36.

As heretofore explained, the unit shown in Fig. 3 may be applied to the valve body shown in Fig. 4, but in this instance, it is assumed that more threads are required, than are provided by the threaded collar. Therefore I provide the internally threaded dust cap 37 which screws directly over the valve body. The lower end of the said cap accordingly enters said annular space in telescopic relation to the sleeve 34.

As shown in Fig. 5 the entire unit presents a finished appearance, the telescopic relation between the cap and sleeve making the unit adjustable to various lengths of valve bodies. The telescopic fit between the two should be close enough to exclude dust and moisture, and by enclosing the valve body entirely, the threads thereon are fully protected.

In conformance with the invention, the dust cap 37 is provided at the upper end with a conical member 38, which in this instance is an integral part thereof. The cap and sleeve together provide a complete extensible dust cap, and because the complete device is extensible, the conical member 38, need not be adjustable, relative to the member 37. In forming the conical member integrally with the member 38, the upper end of cap is indented, as at 39, provided the cap is made by stamping. If the cap is machined from solid stock, the cone may be substantially the same shape, but the indentation 39 is not required.

Figure 7:
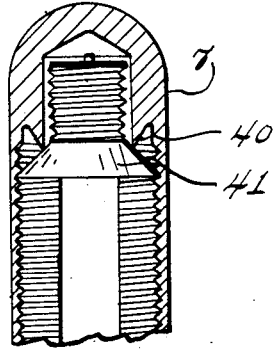
Fig. 7 is a vertical section of another form of the invention applied to an air cap alone.

In Fig. 7, I have shown a modification of the cap 37. In this form of the invention, the cap is provided at the inner end with a downwardly ranging, comparatively sharp annular portion 40. Said portion is adapted to cut its way into, and seat firmly on the sloping surface 41 common to valve bodies of the type shown.

While I have shown and described specific embodiments of my invention I do not limit myself to any specific embodiment, and may alter the construction and arrangement of parts shown, and employ other embodiments without enlarging the scope of my invention, within the appended claim.

I claim as my invention:

In a closure device for externally threaded tire valve bodies, a cap provided with a central bore open at one end of said cap and terminating deep within said cap; said bore provided with threads of constant diameter whereby said cap may be screw threaded on said valve body, and an externally threaded plug removably threaded into said bore upon the threads thereof; said plug having each of its ends tapered to provide a seating surface at each such end of diminishing diameter outwardly; said ends each adapted for air tight engagement with a valve body; said ends also adapted to coact with the inner closed end of such bore to limit inward movement of the plug; the threaded portions of the bore and plug respectively being arranged to permit of inward screw-threaded movement of the plug to bring one end of the plug into contact with the closed end of said bore; that end of the plug not in contact with the inner end of the bore being directly accessible from the open end of said bore.

CLARENCE S. PRESTON.